Aug. 18, 1942.  H. T. RITTER  2,293,172
DEVICE FOR EMBOSSING THE SIDES OF CERAMIC POTS
Filed Aug. 3, 1939  2 Sheets-Sheet 1
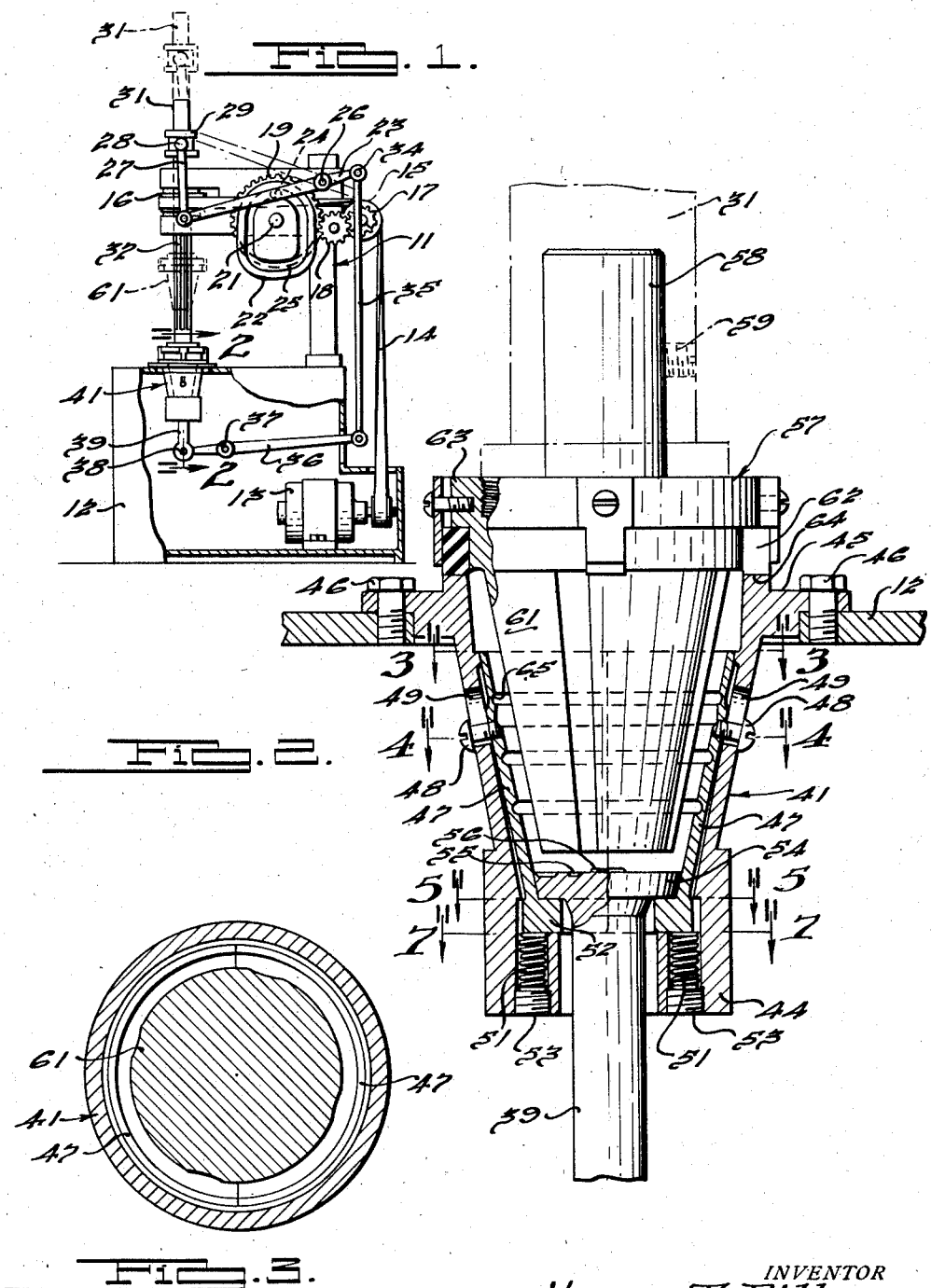
INVENTOR
Henry T. Ritter.
BY
Harness, Dickey & Pierce.
ATTORNEYS.

Aug. 18, 1942.    H. T. RITTER    2,293,172
DEVICE FOR EMBOSSING THE SIDES OF CERAMIC POTS
Filed Aug. 3, 1939    2 Sheets-Sheet 2
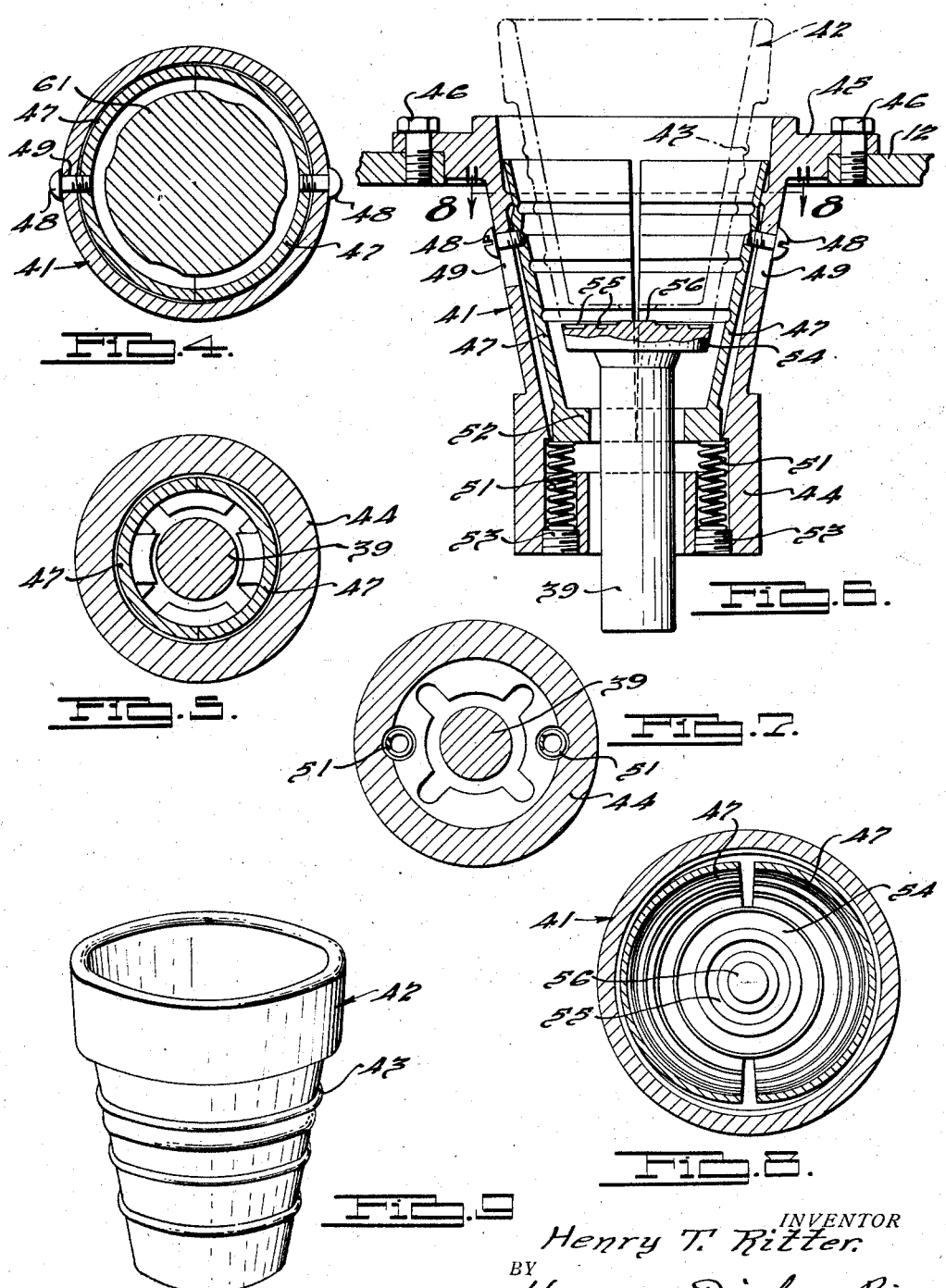
INVENTOR
Henry T. Ritter.
BY
Harness, Dickey & Pierce.
ATTORNEYS.

Patented Aug. 18, 1942

2,293,172

UNITED STATES PATENT OFFICE 2,293,172

DEVICE FOR EMBOSSING THE SIDES OF CERAMIC POTS

Henry T. Ritter, South Rockwood, Mich.

Application August 3, 1939, Serial No. 288,075

5 Claims. (Cl. 25—28)

My invention relates to molds and particularly to a mold and apparatus for shaping flower pots having portions projecting beyond others to form an embossment.

Heretofore, when employing a plunger of truncated conical shape to be inserted within a truncated conical mold of larger internal diameter, to force the material out between the plunger and mold to thereby form the pot to the shape of the mold and of a thickness of the spacing of the plunger from the mold, care was always exercised to have all mold lines fall within parallels to the axis of the pot so that the pot could be removed from the mold. It was for this reason that the commercial form of flower pots were limited in design and were of truncated conical formation.

In practicing my present invention, I contemplate employing a mold and method which permits designs to be embossed on the outer surface of the pot beyond parallel lines to the pot axis. The same plunger referred to hereinabove is employed but the female mold portion is split to provide two or more sections which are movable apart to permit the embossed portion on the outer surface of the pot to clear the mold sections. The bottom of the pot constitutes the head of a stem which engages the inwardly projecting flanges at the bottom of the sections. The stem is interconnected with the mechanism of the device to move upwardly to permit springs to move the sections upwardly and therefore apart as the plunger moves upwardly. The molded pot may then be removed from between the sections which are immediately moved together through the downward movement of the stem ahead of the downward movement of the plunger to permit the joints to be tightly engaged before a new ball of ceramic material is inserted in the mold as the plunger moves downwardly toward the pot.

Accordingly, the main objects of my invention are; to employ a method of molding pots with substantially no additional cost while producing embossed designs on the outer surface thereof; to provide a mold made of a plurality of sections having embossed designs therein which separate to permit the pot to be removed after the molding operation is completed; to provide a receptacle for split sections of a mold having inwardly projecting flanges at the bottom which are engaged by the head of the stem to move the sections into intimate relationship when the stem is moved downwardly; to interconnect the stem and split sections of a mold to the operating mechanism of the machine so that the plunger, while continuously driven in rotation and is lowered into the mold and retained therein a predetermined length of time while the sections are retained in intimate relationship and when raised the sections are separated to permit the pot to be removed from the mold; and in general, to provide a method and apparatus for molding flower pots having embossed surfaces, which is simple in construction, positive in operation, and economical of manufacture.

Other objects and features of novelty of my invention will be either specifically pointed out or will become apparent when referring, for a better understanding of my invention, to the following description taken in conjunction with the accompanying drawings, wherein:

Figure 1 is a broken view of a machine and mold for practicing my method of making flower pots, embodying features of my invention;

Fig. 2 is an enlarged sectional view of the mold illustrated in the machine of Fig. 1;

Fig. 3 is a sectional view of the structure illustrated in Fig. 2, taken on the line 3—3 thereof;

Fig. 4 is a sectional view of the structure illustrated in Fig. 2, taken on the line 4—4 thereof;

Fig. 5 is a sectional view of the structure illustrated in Fig. 2, taken on the line 5—5 thereof;

Fig. 6 is a view of structure, similar to that illustrated in Fig. 2, with the plunger retracted and the molded pot in position to be unloaded;

Fig. 7 is a sectional view of the structure illustrated in Fig. 2, taken on the line 7—7 thereof;

Fig. 8 is a sectional view of the structure illustrated in Fig. 6, taken on the line 8—8 thereof; and, Fig. 9 is a view of one form of pot which may be formed in the mold embodying my invention.

The sectional mold embodying my invention permits the embossing of the material beyond the base surface of the pot and at the same time eliminates vent holes required in solid molds which prevent the air from being trapped in sections of the pot. This increases the life of the pot since heretofore the metal about the apertures eroded more rapidly than the base metal of the pot and such eroding is eliminated in my construction.

In Fig. 1, I have illustrated a machine 11 embodying a base 12 supporting a motor 13 for driving a belt 14. The belt runs over pulleys 15 to operate a pulley 16 in rotation. The pulley 15 has a gear 17 attached on the shaft thereof for driving a pinion 18 and a gear 19 mounted on a shaft 21. A cam 22 is secured to the shaft 21 and driven thereby. A link 23 has a roller 24 projecting into a cam track 25. The link is mounted on a pivot 26 having one end pivoted to a link 27 having an end portion 28 with inwardly projecting fingers engaging in the slot in the collar 29 secured to a spindle 31. The spindle is provided with a plurality of splines 32 which engage the splines on the pulley 16 so that as the spindle is rotating the link 27 may be actuated to reciprocate the spindle. The opposite end of the link 23 is pivoted at 34 to a link 35 which is pivoted to the end of a lever 36. The lever 36 is pivoted at 37 to the base of the machine, while the opposite end 38 of the lever has a slot and pin connection with a stem 39 disposed in the bottom of a mold 41.

The mold 41 is intaglioed on its inner surface to produce a flower pot such as the pot 42 illustrated in Fig. 9, having embossed portions such as the annular rings 43 on its outer surface. To permit the embossments to be formed in the outer surface of the pot, the mold is split into a plurality of sections which are separated after the molding operation to permit the pot to be removed.

Referring to Figs. 2 to 8, inclusive, I have illustrated the mold 41 as embodying an outer housing 44 having an annular flange 45 which is secured to the base 12 by bolts 46. Within the housing the mold sections 47 are mounted and are herein illustrated as being two in number. It is to be understood that the mold may be divided into a greater number of sections depending upon the amount of embossing on the side of the pot and the size of the pot itself.

The sections 47 are secured to the housing 44 by screws 48 projecting through slots 49 in the housing wall. The sections are movable upward within the housing while retained against the housing wall and thereby move away from each other to provide clearance for the embossed portions of the pot. A plurality of springs 51 are provided in the base of the housing 45, engaging the base 52 of each section for moving the sections upwardly. After the springs have been inserted in apertures at the base of the housing 44, threaded plugs 53 retain the springs in position. The base 52 provides a shoulder engageable by a head 54 on the stem 39. The head 54 forms the base of the pot, the top surface of which may be provided with recessed portions 55 and embossed portions 56 to provide a predetermined form to the base.

The spindle 31 supports a plunger 57 through the engagement of a shank 58 thereof secured by suitable means herein illustrated as by set screws 59. The plunger has a molding head 61 the shape of the inside of the pot and is of truncated conical section having clearance from the wall of the sections 47 the thickness of the wall of the pot. A plurality of rubber blocks 62 are secured to an annular shoulder 63 at the top of the pot to engage the top 64 of the housing 41 to wipe any excess material from the pot itself which may be forced from the top of the mold during the pot formation. While I have illustrated recesses 65 in the wall of the sections 47, it is to be understood that such showing was made for the purpose of illustration, and that any form of recess may be provided in the walls of the section to produce a desirable embossment on the outer surface of the pot.

In operation, the spindle 31 is constantly rotated and is raised and lowered by the lower portion of the cam track 25 as illustrated in Fig. 1, while a dwell is provided on the cam to retain the molding head 61 within the mold portion 41 a predermined length of time, sufficient to produce the complete molding operation. Thereafter the spindle is raised and during the raising operation the stem 39 of the mold portion 41 is moved upwardly permitting the springs 51 to move the mold sections 47 upwardly and therefore outwardly to have the embossed portions 43 of the molded pot, clear the sections so that it may be removed during the continued upward movement of the plunger 57. The plunger is lowered thereafter and during the lowering operation a predetermined amount of molding material is dropped within the mold portion 41 to be immediately acted upon by the molding head 61 as the spindle 31 completes its downward movement while forcing the material upwardly in the space between the mold sections 47 and the molding head 61.

In this manner, pots having embossed outer surfaces may be molded as efficiently as pots now being molded in one-piece molds. This is a material advancement in the art since heretofore pots having embossed faces were formed in a different type of mold requiring an entirely different method, so that the production type of the machine, such as herein illustrated and described, could not be employed for their manufacture.

In solid molds a plurality of apertures are provided at offset wall portions to vent the portions to permit the flow of the ceramic material to all parts of the mold. It was mentioned hereinabove that the wall of the mold adjacent to the apertures wore away very rapidly, resulting in a material reduction in the life of the mold. When practicing the present invention, I eliminate the vent holes at the offset portions in the mold surface and procure the desired venting of the air through the slot between sections 47 of the mold. The necessary venting is not only obtained in this manner, but the life of the mold is materially increased by eliminating the apertures heretofore provided.

Furthermore, in a solid wall mold, difficulty has always been experienced by the hanging of the pots on the plunger or in the mold which disported the molded material, resulting in a scrapped pot. A considerable amount of oil is used in the pot and on the plunger to minimize this sticking, but this was also objectionable because the mixture of oil and air produced porous spots in the pot wall. When practicing my invention I prefer to move the plunger 57 ahead of the stem 39 to thereby eliminate the hanging of the pot on the plunger since the embossed portions on the pot anchor the pot within the mold. Thereafter, the upward movement of the stem 39 permits the movement of the sections 47 of the mold away from each other to release the pot therefrom before the stem is moved further to raise the pot out of the mold. As a result of this sequence in operation, embodying first the raising of the plunger and secondly, the separation of the mold sections and thereafter the operation of the stem to raise the pot, the use of the oil and the resulting porous walls is materially reduced and the hanging of the pots on the plunger or in the mold is eliminated.

A further novelty obtained from this method resides in the reduction in weight of the pot, as the walls may be made thinner since the strain on the soft material after molding has been eliminated.

While I have described and illustrated but a single embodiment of my invention, it will be apparent to those skilled in the art that various changes, omissions, additions, and substitutions may be made therein without departing from the spirit and scope of my invention, as set forth in the accompanying claims.

What I claim is:

1. A mold providing embossments on the side of ceramic pots which includes, a housing, mold sections secured therein for limited upward and outward movement, inwardly directed flanges on said sections, a stem engaging the flanges of the sections for holding the sections down and in intimate relation with each other, a plunger projectible within said sections, and spring means for moving said sections upwardly a limited amount when the stem is moved upwardly a greater amount.

2. A device for embossing the side of ceramic pots which includes, a housing, flanged mold sections secured therein for upward and outward movement, a stem having a head forming the base of the mold engaging the flanges of the sections for holding the sections down and in intimate relation with each other, a plunger insertable in said mold, and spring means for moving said sections upwardly a limited amount when the plunger and head are moved upwardly whereby the head moves independently of the sections.

3. A device for embossing the sides of ceramic pots which includes a mold made up of a plurality of separable sections, a stop, spring means for moving said sections upwardly against said stop, an ejector within the mold movable axially relative to said sections and also movable therewith, means for moving said ejector to engage said sections for moving them into engagement with each other, a plunger, and means for moving said plunger within said sections.

4. A device for embossing the sides of ceramic pots which includes a mold made up of a plurality of separable sections, a stop, spring means for moving said sections upwardly against said stop, an ejector within the mold movable axially relative to said sections and also movable therewith, means for moving said ejector to engage said sections for moving them into engagement with each other, a plunger, means for moving said plunger within said sections, and driving means for continuously reciprocating said ejector and said plunger in timed sequence, including means for retaining said plunger at the end of its stroke within said sections for a predetermined length of time.

5. A machine for molding embossed ceramic pots including, in combination, a mold split into a plurality of sections, a stem for drawing said sections together into intimate relationship, a stop for limiting separation of the sections, a spindle, a plunger carried by the spindle, means for reciprocating said plunger into and out of the mold, and means for operating the stem in synchronism with said reciprocating means for releasing said sections to permit them to separate against the stop while the stem further moves to raise the pot from the sections as the plunger is moved from the mold and for thereafter operating the stem in the opposite direction to move said sections into intimate relationship before the molding head enters the mold any appreciable amount.

HENRY T. RITTER.